United States Patent
Shigeeda

(10) Patent No.: US 7,913,296 B2
(45) Date of Patent: Mar. 22, 2011

(54) ENCRYPTED COMMUNICATION METHOD AND SYSTEM

(75) Inventor: Nobuyuki Shigeeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1125 days.

(21) Appl. No.: 11/140,995

(22) Filed: Jun. 1, 2005

(65) Prior Publication Data

US 2005/0273843 A1  Dec. 8, 2005

(30) Foreign Application Priority Data

Jun. 2, 2004  (JP) .................................. 2004-165043
May 23, 2005  (JP) .................................. 2005-149618

(51) Int. Cl.
 *G06F 7/04*  (2006.01)
(52) U.S. Cl. ............................................................ 726/5
(58) Field of Classification Search ...................... 726/5
 See application file for complete search history.

(56) References Cited

U.S. PATENT DOCUMENTS

| | | | | |
|---|---|---|---|---|
| 5,694,486 | A | 12/1997 | Shigeeda et al. | 382/197 |
| 5,708,714 | A | 1/1998 | Lopez et al. | |
| 6,148,405 | A * | 11/2000 | Liao et al. | 726/2 |
| 6,232,978 | B1 | 5/2001 | Ishida et al. | 345/427 |
| 6,480,957 | B1 * | 11/2002 | Liao et al. | 713/170 |
| 6,963,971 | B1 * | 11/2005 | Bush et al. | 713/153 |
| 6,996,717 | B2 * | 2/2006 | Yin et al. | 713/176 |
| 7,240,192 | B1 * | 7/2007 | Paya et al. | 713/152 |
| 7,246,230 | B2 * | 7/2007 | Stanko | 713/155 |
| 7,526,798 | B2 * | 4/2009 | Chao et al. | 726/5 |
| 7,581,243 | B2 * | 8/2009 | Shigeeda | 726/3 |
| 2001/0023487 | A1 * | 9/2001 | Kawamoto | 713/202 |
| 2005/0071677 | A1 * | 3/2005 | Khanna et al. | 713/201 |
| 2005/0172132 | A1 * | 8/2005 | Chen et al. | 713/180 |
| 2006/0064588 | A1 * | 3/2006 | Tidwell et al. | 713/169 |

FOREIGN PATENT DOCUMENTS

| | | |
|---|---|---|
| JP | 6-54485 | 7/1994 |
| JP | 8-204696 | 8/1996 |
| JP | 2000-222360 | 8/2000 |

* cited by examiner

*Primary Examiner* — Kambiz Zand
*Assistant Examiner* — Teshome Hailu
(74) *Attorney, Agent, or Firm* — Fitzpatrick, Cella, Harper & Scinto

(57) ABSTRACT

An encrypted communication system according to the present invention comprises an authentication server in which a user password and an encryption key of a server were registered, a client involved in utilization by a user, and a server providing a service. According to the encrypted communication system, shared credentials for the client and the server to conduct encrypted communication are generated separately by the authentication server and the client based on mutually shared information, a ticket is generated in which the credentials that were generated by the authentication server are encrypted with the encryption key by the authentication server, and the client encrypts information to be sent using the credentials generated by the client and attaches the ticket that was acquired from the authentication server to the encrypted information to send the encrypted information and the ticket to the server.

9 Claims, 7 Drawing Sheets

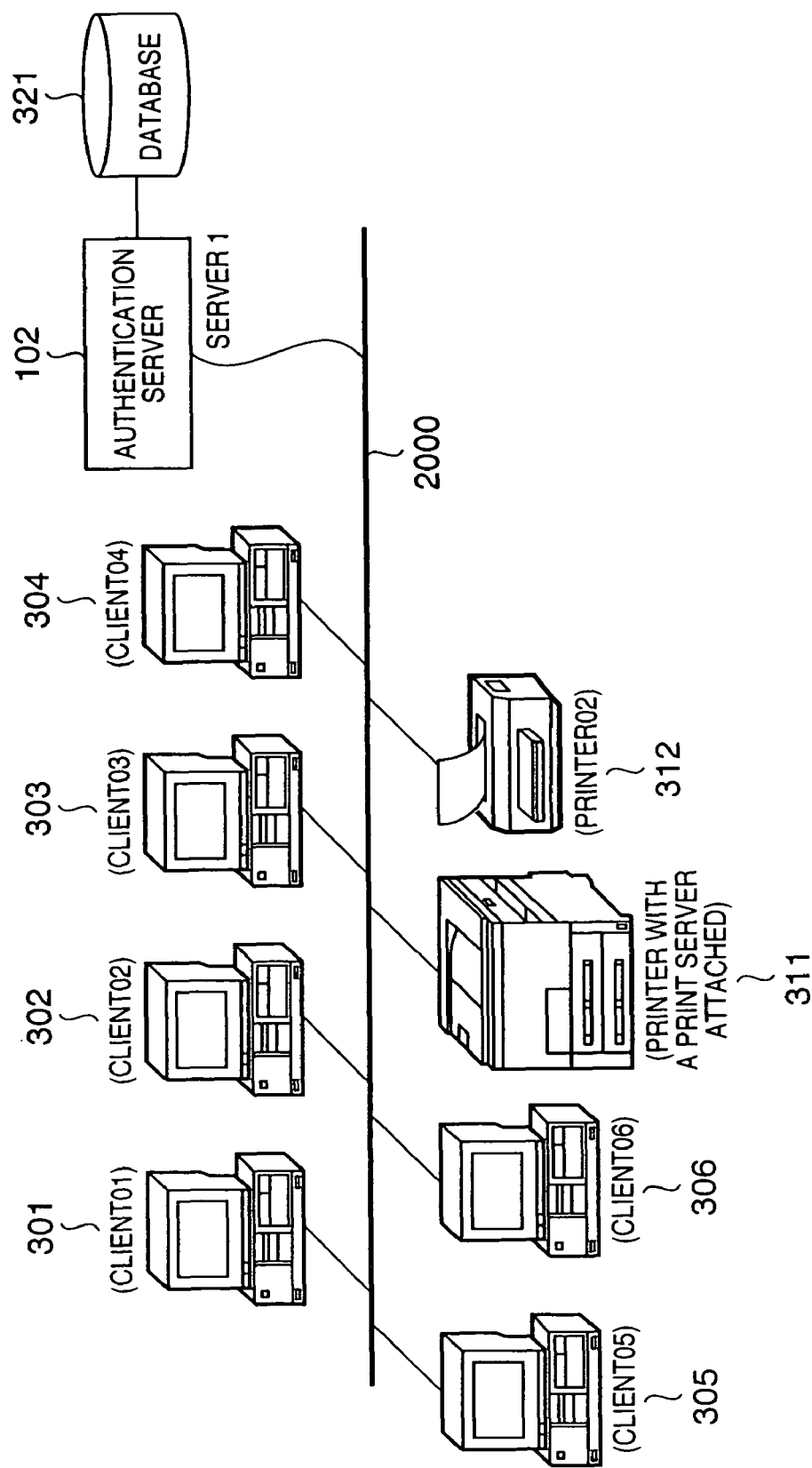

ENCRYPTED COMMUNICATION METHOD AND SYSTEM

FIELD OF THE INVENTION

The present invention relates to encrypted communication of information, and for example relates to an encrypted communication method and encrypted communication system and the like for preventing the leakage or alteration of confidential information on a communication path and for preventing attacks on a server by a malicious client in a client-server system.

BACKGROUND OF THE INVENTION

In recent years, accompanying the advances in computer communication technology, it has become normal for confidential information of various levels to be sent over information communication networks. Examples of such confidential information include citizen register information and registry information that is handled by government and other public offices. In business enterprises also, various kinds of information of trade secrets are converted into electronic form to allow the information to be shared utilizing computer networks. Because of these circumstances, maintaining the confidentiality of electronic information flowing on a network is an extremely important problem.

In addition to maintaining confidentiality, since required confidential information loses its value as information unless it can be used when required, it is necessary to establish suitable countermeasures to prevent hazards such as, for example, alteration of information or destruction of data caused by various kinds of attacks.

In order to achieve these objectives, encrypted communication protocols such as SSL (Secure Sockets Layer) or TLS (Transport Layer Security) have been devised and are in practical use in conventional information communication among computers comprising client-server systems.

In addition to these standard technologies, other cases in which systems have been devised and practically applied include user authentication to which a terminal control system was applied (see Patent Document 1) and, as seen in the Kerberos protocol, a mechanism that combines user authentication and an encryption key exchange function for realizing encrypted communication on a communication path (see Patent Document 2 etc.).

Further, in contrast to the Kerberos protocol in which a secret key used in encrypted communication between a client and a server is generated by an authentication server, a system also exists in which a client generates a secret key for encrypted communication after undergoing user authentication.

In another example of the prior art, the aforementioned Kerberos protocol is applied to realize a so-called single sign-on function in which once a client has received user authentication, any accesses made by the client to the same server thereafter are permitted without the client having to undergo user authentication again (Patent Document 3). In this example of the prior art, a ticket to enable access by a client to an authorization server is generated by an authentication server, and the client uses the ticket to access the authorization server. A feature of this method for generating tickets is that irreversible operations are performed a plurality of times and a difference in the operation results over the relevant number of times is utilized to determine whether or not to permit a single sign-on.

[Patent Document 1] Japanese Patent Publication No. 6-54485
[Patent Document 2] Japanese Patent Laid-Open No. 08-204696
[Patent Document 3] Japanese Patent Laid-Open No. 2000-222360

SUMMARY OF THE INVENTION

Encrypted communication protocols such as SSL and TLS establish connection-oriented network communication channels to conduct encrypted communication. These protocols can achieve the object of encrypted communication without any problem in a system according to an ordinary client-server system.

Meanwhile, secure printing systems exist in which, when a user is printing a confidential document, user authentication is also requested by the printing device (for example, a printer) at the time of printing. In this kind of secure printing system, a spooler or print server is provided between the client on the side issuing the print instruction and the printing device side that processes the print job. Therefore, a direct SSL or TLS connection is not established between the client and the printing device. Further, when a print job is sent to a printing device, printing commands that are described in PDL (page description language) are embedded in the print job. The print job is thus considered to be implemented by a connectionless communication. Accordingly, it is difficult to utilize a connection oriented encrypted communication protocol such as SSL or TLS to maintain the confidentiality of a print job or to prevent alteration thereof.

Further, in a client-server system, there is also the possibility that a client computer is a malicious client. More specifically, it is possible that some kind of modification was added to a component on the client PC side, for example a printer driver or the like, by a malicious user to create a malicious client. There is then a concern that the user will use this malicious client without the knowledge of the network administrator or computer administrator. In this case, a user can execute a printing operation after having undergone login authentication to log onto the system. At this time, the threat exists of the malicious client carrying out malicious acts unbeknownst to a user, such as arbitrarily adding alterations to print data, embedding therein malicious data that will attack a server, or stealing the print data itself.

Further, as mentioned in the background art, it is difficult to implement adequate countermeasures to the aforementioned threats using an encrypted communication protocol in which the client generates an encryption key to conduct encrypted communication. This is because in this protocol the client generates the encryption key, and therefore the server accepts data without being able to know whether or not the client has a malicious intention. It is thus possible for a client to generate junk data for the server, and then attack the server by utilizing the encryption key that the client generated by itself to send the junk data to the server.

Further, in encrypted communication according to the Kerberos protocol such as user authentication that applies a common management protocol, since a characteristic of the protocol is that a session key is generated on the authentication server side, a disadvantage exists in that security is dependent on the reliability of the authentication server (KDC) and it is therefore necessary to establish a management operations mechanism that ensures the authentication server (KDC) itself is not threatened, and thus operating costs increase.

Regarding Patent Document 3 exemplified in the background art, as with the Kerberos protocol, because the reliability of the authentication server is the factor ensuring the security of the single sign-on function, it can be considered to have the same disadvantage as that of the Kerberos protocol.

This invention was devised in view of the above-described background art, and an object of this invention is to maintain the confidentiality, integrity and usability of data on a communication path and realize secure communication, even in connectionless network information communication that is typified by secure printing. Further, distribution of the reliability of an authentication server with the aim of reducing costs required for management operations of the authentication system may be mentioned as another object of this invention.

In order to achieve the foregoing objects, this invention is configured as follows.

According to this invention, there is provided an encrypted communication system comprising an authentication server in which a user password and an encryption key of a server were registered, a client that is involved in utilization by a user, and a server providing a service, wherein:

shared credentials for the client and the server to conduct encrypted communication are generated separately by the authentication server and the client based on mutually shared information, a ticket is generated in which the credentials generated by the authentication server are encrypted with the encryption key by the authentication server, and the client encrypts information to be sent using the credentials generated by the client and attaches the ticket acquired from the authentication server to the encrypted information and sends this to the server.

Thus, the encrypted communication method and system of this invention are composed of an authentication server in which a user password and an encryption key of a server are previously registered, a client provided for utilization by a user, and a server that provides a printing service or documentation management service or the like, wherein an encryption key to allow a client and a server to conduct encrypted communication is generated from a user password and a random numerical value that is generated by the authentication server, and generation of an encryption key is conducted separately at the authentication server and on the client side, and the encryption key generated by the authentication server is additionally encrypted in a form that makes it impossible for the client to know the encryption key.

In an encrypted communication protocol and system configured as described above, since a job issued from a client is encrypted and transmitted to a server, the confidentiality of information on the sending path is maintained. Further, since a logical encrypted communication channel such as SSL or TLS is not established, and instead the data itself is encrypted and transmitted, the confidentiality of information can be maintained even if a spooler or the like is present along the communication path.

Since a client receives a random number from the authentication server and then generates an encryption key to be utilized for encryption of information using the random numerical value in question and a user password that is input by a user, it is not possible for a malicious client to select or generate an encryption key by itself. Thus, the reliability of a secret key utilized for encryption of confidential information can be enhanced.

In addition, since a client generating a secret key by itself is linked to distribution of the reliability of an authentication server, it is possible to reduce the costs required for management operations of the authentication system.

Further, because the generation of an encryption key and the generation of information for transmission to a server are carried out consecutively as a unified process, it is difficult for a malicious client to alter information or generate malicious data. As a result, attacks on a server by a malicious client can be inhibited.

In addition, since a server conducts decryption processing using an encryption key extracted from an access ticket when it decrypts encrypted data that was received from a client, when decryption was successful the server can recognize that the encryption key utilized for decryption is the same as the encryption key used by the client. Thus, the server can infer by analogical reasoning that a user password entered by a user attempting to log into a client is a true user password that was previously registered in the authentication server. Hence, it is possible for the server to recognize that a user that logged into a client is a true user that is registered in the authentication server, and with that the server can change to user authentication.

According to this invention, even in connectionless network information communication as typified by secure printing, it is possible to maintain the confidentiality, integrity and usability of data on a communication path and to realize secure communication. Further, the reliability of an authentication server can be distributed to allow a reduction in the costs required for management operations of an authentication system.

Other features and advantageous of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a view showing the configuration of a printing system to which the encrypted communication system was applied.

DETAILED DESCRIPTION OF THE PREFERRED EMBODIMENTS

First Embodiment

<System Configuration>

Figure 1:
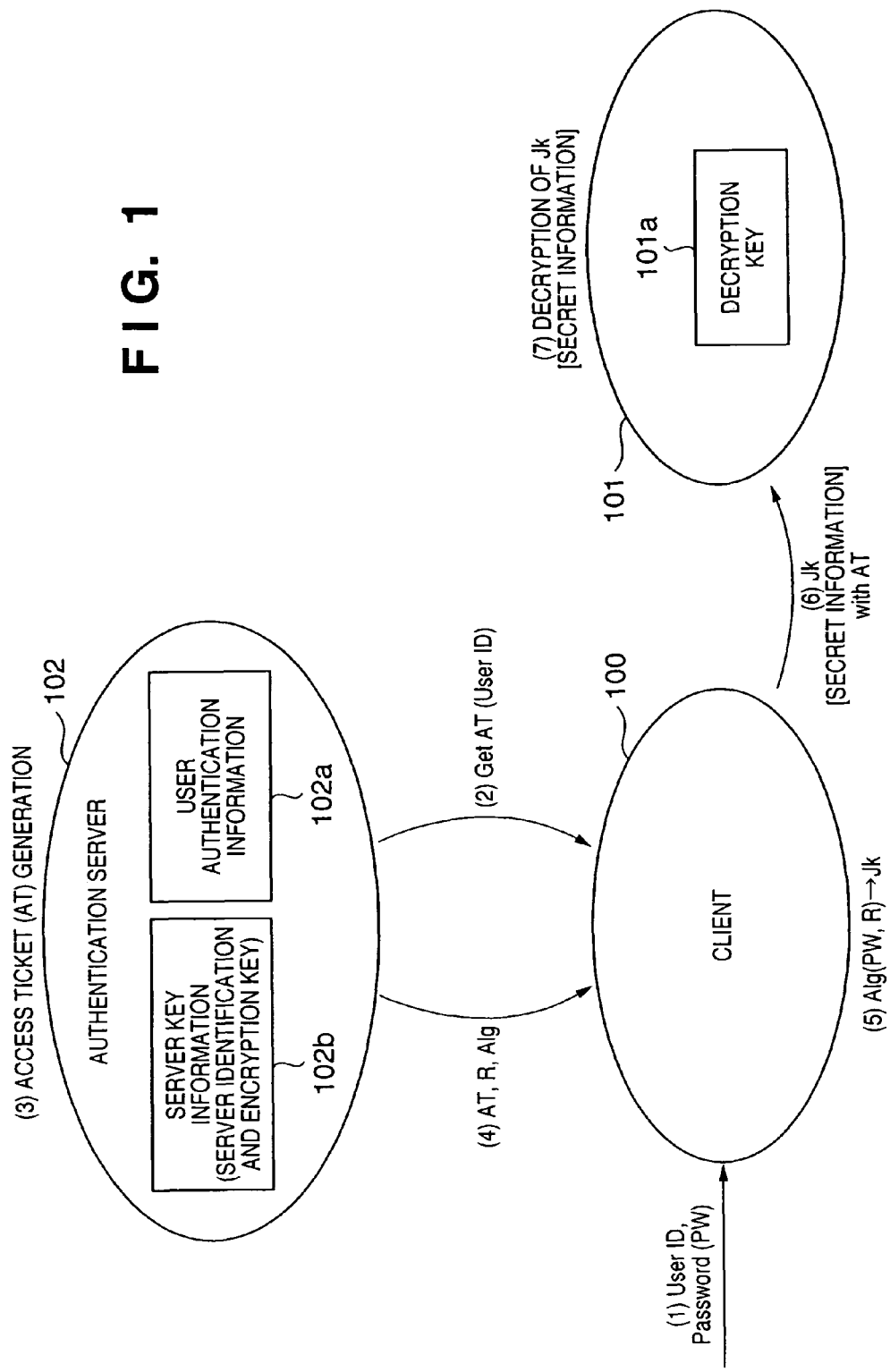
FIG. 1 is a view showing the configuration of an encrypted communication system of this invention.

Hereunder, embodiments of this invention are described referring to the drawings. FIG. 1 is a view showing the configuration of an encrypted communication system of this invention. In FIG. 1, a user accesses the system through a client terminal 100.

A server 101 corresponds to a server function part that is installed on a computer or input/output device or the like. Accordingly, the server 101 may have various forms as an overall device. For example, the server 101 may be a printer device with a print server function, a network scanner device, a digital multi-function device that has a network connection function, or a file server or a World Wide Web server or the like. Herein, the server 101 includes all devices having this kind of server function. However, in this embodiment the server 101 is a print server, and more particularly a print server incorporated in a printer. The server 101 holds a unique decryption key 110a.

An authentication server 102 manages a database of information such as user authentication information or user-specific access control information as user information. These kinds of information are together referred to as user authentication information (denoted by reference numeral 102a in FIG. 1). The user authentication information 102a includes at least a set comprising a user-specific ID and a registered password corresponding thereto. Access control information is information that defines the access authority to system resources for each user. In addition to these, the authentication server also contains server key information 102b that includes a server identification for specifying another server that is under the control of the authentication server and a unique encryption key Sk (an encryption key corresponding to a decryption key 110a) that corresponds with that server identification. The authentication server 102 has a function that conducts centralized processing for user authentication and access control to resources and the like at the time of utilization of network resources. As examples of a device comprising an authentication server, a Windows (registered trademark) domain controller, or a LDAP server or the like may be mentioned. In this connection, there are cases in which the encryption key Sk of the server key information 102b and the decryption key 110a are common keys, and cases in which the encryption key Sk is a public key and the decryption key 110a is a secret key.

The client terminal 100, the server terminal 101 and the authentication server 102 are connected to each other through a network, and in some cases a plurality of the client terminal 100 and the server 101 may be present in the network in question.

Figure 6:
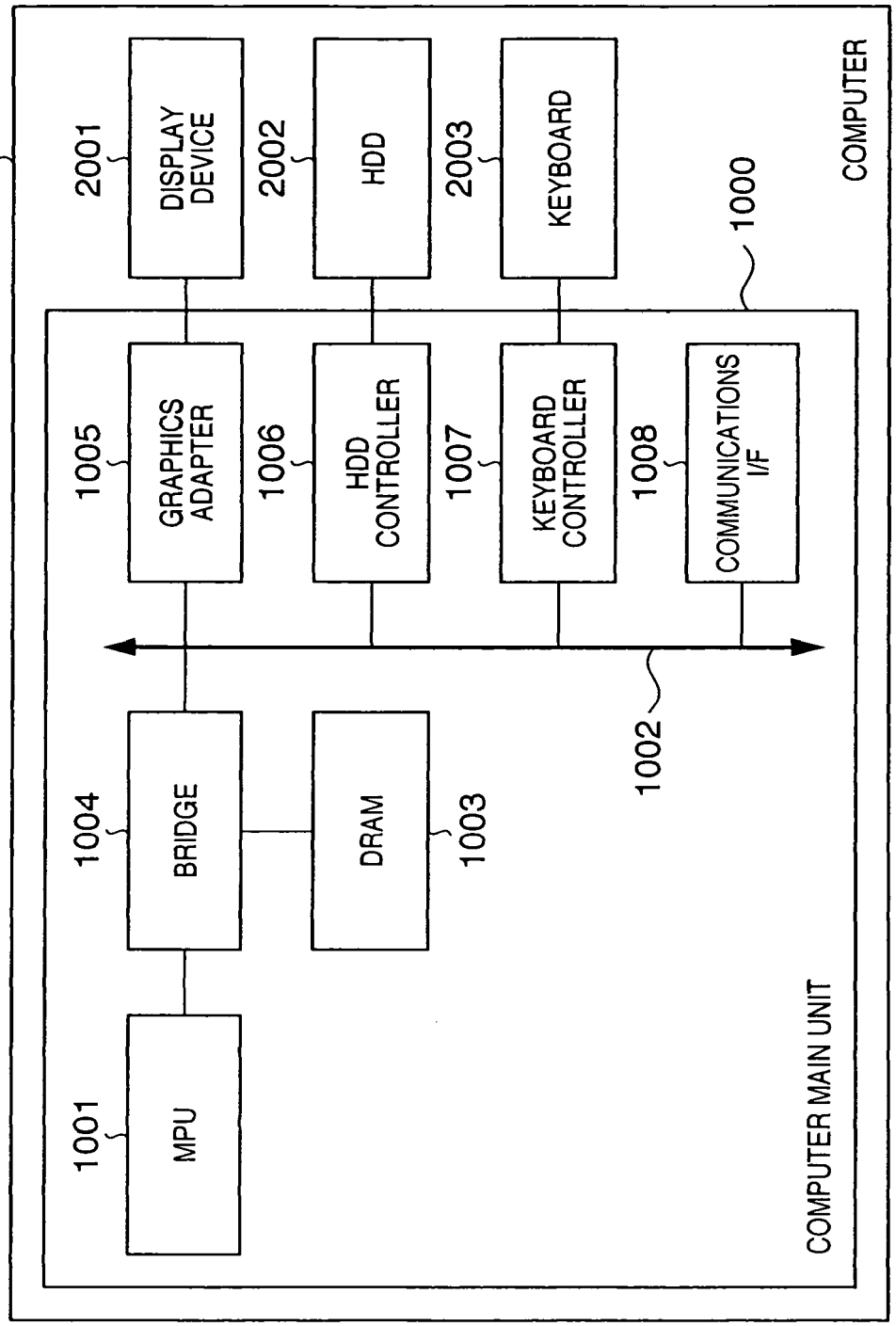
FIG. 6 is a block diagram of a computer.

FIG. 6 is a block diagram of a general purpose computer that functions as the client terminal 100, the server 101 or the authentication server 102. As shown in FIG. 6, the client terminal 100, server 101 or authentication server 102 comprise an overall device including a processing unit 1000 and peripheral equipment thereof.

In FIG. 6, the processing unit 1000 comprises an MPU 1001 that governs the overall control of the host device in accordance with a control program, a bus 1002 that connects the system components to each other, a DRAM 1003 that temporarily stores data or programs executed by the MPU 1001 and the like, a system bus and a memory bus, a bridge 1004 connecting with the MPU 1001, and a graphics adapter 1005 equipped with a control function for displaying graphic information on, for example, a display device 2001 such as a CRT display.

The processing unit 1000 further comprises a HDD controller 1006 that is responsible for an interface with a HDD device 2002, a keyboard controller 1007 that is responsible for an interface with a keyboard 2003, and a communications I/F 1008 such as an NIC for connecting to a communication line such as a LAN.

Further, the display device 2001 (for example, a CRT display) that displays graphic information or the like to an operator is connected to the processing unit 1000 through the graphics adapter 1005. The hard disk drive device 2002, a mass storage device in which are stored programs (programs for the procedures shown in FIG. 3 to FIG. 5) or data, or in the case of the authentication server 102, user authentication information (user ID and a password corresponding thereto etc.), or an encryption key corresponding to a decryption key of the server 101, and the keyboard 2003 are also respectively connected to the processing unit 1000 through controllers.

In this connection, because the server 101 of this embodiment is a printer server, in place of the graphics adapter 1005 and the display device 2001, or in addition to the configuration of FIG. 6, it has a printer engine and an interface connecting the printer engine and the processing unit 1000.

<Flow of Overall Processing>

Figure 2:
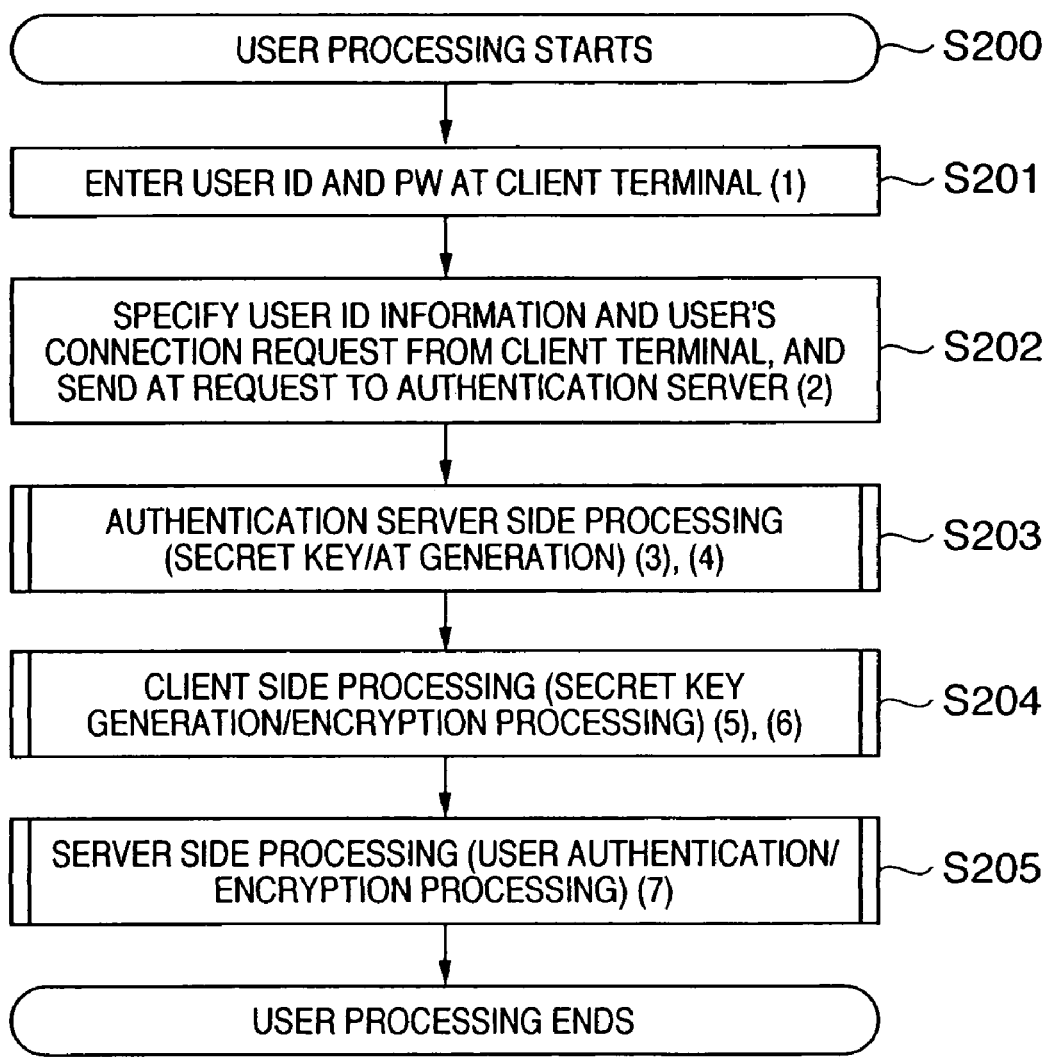
FIG. 2 is a view that illustrates the overall processing flow of the encrypted communication system of this invention.

FIG. 2 is a view that illustrates the overall processing flow of the encrypted communication system of this invention. The number in parenthesis in each block corresponds to a message or an operation that is represented by a number in parenthesis in FIG. 1. FIG. 2 illustrates the series of processing from user authentication to encrypted communication between the client 100 and the server 101 that is carried out when a user logs in from the client terminal 100 to access the server 101 to conduct some kind of processing, for example, secure printing. In this connection, the term "secure printing" refers to a printing process that is protected by encrypting the data to be printed or the like.

In this embodiment, a case is described in which a user implements print processing of a document from the client terminal 100 and this processing is carried out on the server 101 side. In this connection, there is a case hereunder in which the server is an independent device and a case in which the server functions by being incorporated into a device such as a printer. The term "server" is used to include both such cases.

In FIG. 2, the processing starts from step S200 when a user first logs into the client terminal 100. In step S201, the user enters the user's own ID and password (PW) from the client terminal 100 (login). Next, the user opens a document on the client terminal 100, specifies a device (in this embodiment, the server 101) to carry out printing, and then implements printing. At this time, the client terminal 100 specifies a user ID and the target resources information (in this embodiment, information for specifying the server 101 including the aforementioned server identification), and sends a request to issue an access ticket (AT) to the authentication server (S202). An access authority to the system resources is given to a user that holds an access ticket. The access ticket of this embodiment is sealed by encryption by the authentication server 102, and at least the server 101 can open the seal using a decryption key to access the contents thereof. Further, the access ticket of this embodiment includes at least a session key (generated by the authentication server) that can only be used in the session in question. Information showing the term of validity of the access ticket or a time stamp showing the time the access ticket was issued may also be included therein.

In this connection, the login step may be first conducted when a user initially accesses the client terminal 100 (authentication at time of local access) or may be conducted when the user implements printing on the client terminal 100 (authentication at time of access to resources). This depends on the manner of implementation, and the system can be allowed to have a degree of freedom such that changes can be made according to the user security policy.

In step S203, processing is conducted at the authentication server 102 from which an access ticket was requested. The authentication server 102 receives a request to issue an access ticket (abbreviated as "AT" in the figure) from the client terminal 100 and carries out a user authentication step (S203). The main processing contents in this step are the generation of a secret key Jk (corresponds to the aforementioned session key) and the generation of an access ticket in the authentication server 102. In order to generate the secret key Jk, the authentication server 102 generates a random number by itself. Based on the generated random number and the user ID that was received from the client terminal 100, the authentication server 102 generates the secret key (session key) Jk by, for example, applying a certain function to those values. The authentication server 102 then encrypts the pre-encryption information (this is hereunder referred to as "credentials") containing the secret key Jk and the like to generate an access ticket. The encryption key used for encryption is the encryption key Sk included in the server key information 102b that is specified on the basis of the target resource information. In this embodiment, the specified server key information is information concerning the server 101.

It is also possible to conduct user authentication before issuing an access ticket. By using a challenge-response authentication scheme as the authentication method, the challenge code thereof can be used as a random number for generating the above-described session key Jk. In this case, if the client possesses the challenge code used for user authentication, there is no necessity to attach a random number again when issuing an access ticket.

The access ticket is sent to the client terminal 100 together with the generated random number. Upon completion of the series of process requests with the client terminal 100, the secret key Jk generated by the authentication server 102 is completely destroyed inside the authentication server 102. This is done to improve the performance of access ticket request processing of the authentication server 102, and also to prevent a vulnerability arising in the form of leakage of the secret key to outside.

After receiving the random number and the encrypted access ticket from the authentication server 102, the client terminal 100 generates a secret key Jk by itself using the random number and the password entered by the user at the time of user authentication (S204). An algorithm for secret key generation may be specified by the authentication server 102 to the client terminal 100 in a response to an access ticket request to the authentication server 102, or may be stipulated beforehand and contained in the system. Regardless of which method is adopted, the client generates the secret key Jk in accordance with the algorithm. This algorithm must be the same as the algorithm used for generation of the secret key Jk by the authentication server.

Step S204 is a step of operations by the client terminal. When the client terminal 100 has generated the secret key Jk by itself, it uses the secret key Jk to encrypt confidential information to be sent to the server (device) 101. The algorithm used in the processing to encrypt the confidential information may be that specified by the authentication server 102 to the client terminal 100 when generating an access ticket, or may be an algorithm contained in the system. In either case, the algorithm must be an encryption algorithm that corresponds with a decryption algorithm implemented by the server 101. After encrypting the confidential information using a predetermined encryption algorithm, the client terminal 100 attaches the access ticket received from the authentication server 102 to the aforementioned encrypted confidential information and sends them together to the server (device) 101. When combining the encrypted confidential information and the encrypted access ticket, a predetermined delimiter may be inserted between the confidential information and the access ticket to identify the location at which the data is combined, or a structure may be selected whereby data-size information is stored in the header of the send data.

Step S205 is a step of operations by the server 101. The server (device) 101 receives the encrypted data from the client terminal 100 and extracts the access ticket from the received data. The access ticket was encrypted earlier at the authentication server 102 using the encryption key Sk of the server (device) 101, and the server (device) 101 thus decrypts the access ticket using the decryption key 110a to extract the credentials. The secret key Jk that was previously generated by the authentication server 102 is stored in the access ticket, and using this secret key Jk the server (device) 101 attempts to decrypt the encrypted confidential information that was sent by the client terminal 100. At this time, as the criteria for evaluating whether or not the decryption processing was successful, the server (device) 101 can know whether or not the user is duly authenticated by the authentication server 102. More specifically, when decryption of the confidential information is successful, the server (device) 101 can judge that the user that is the sender of the confidential information is authenticated. If the decryption processing fails, it indicates that the secret key Jk generated by the authentication server 102 and stored in the access ticket is different to the secret key Jk that was generated by the client terminal 100, whereby the server (device) 101 can know that the user is not a user that was authenticated by the authentication server 102. In this connection, the success or failure of decryption processing can be determined utilizing a checksum included in the encrypted confidential information. For example, the overall checksum may be included in the confidential information before encryption. Then, the checksum is recalculated after decryption taking as a target region the same region as that used to calculate the checksum before encryption. Accordingly, if the recalculated checksum matches the checksum included in the confidential information, the decryption can be determined as successful. In this respect, since this invention utilizes technology included in various kinds of common encryption algorithms, a more detailed description thereof is omitted in the embodiments.

The server (device) 101 that carried out decryption processing successfully can utilize other information included in the access ticket, for example access control information, to know the access authority of the user with respect to the encrypted confidential information. Based on this, the server (device) 101 continues processing of the confidential information that underwent the decryption processing. More specifically, since this embodiment is one that implements printing processing, after verifying the consistency with the user's authorization, printing processing of PDL data is carried out (S205).

Upon completing the processing to print the PDL data, the series of processing requests of the user ends (S206). In this connection, in order to strengthen system security, after reception of confidential information and job processing has been carried out at the server (device) 101, audit processing may be conducted in which the details of these processing operations are accumulated in a log.

<Processing at the Authentication Server 102>

Figure 3:
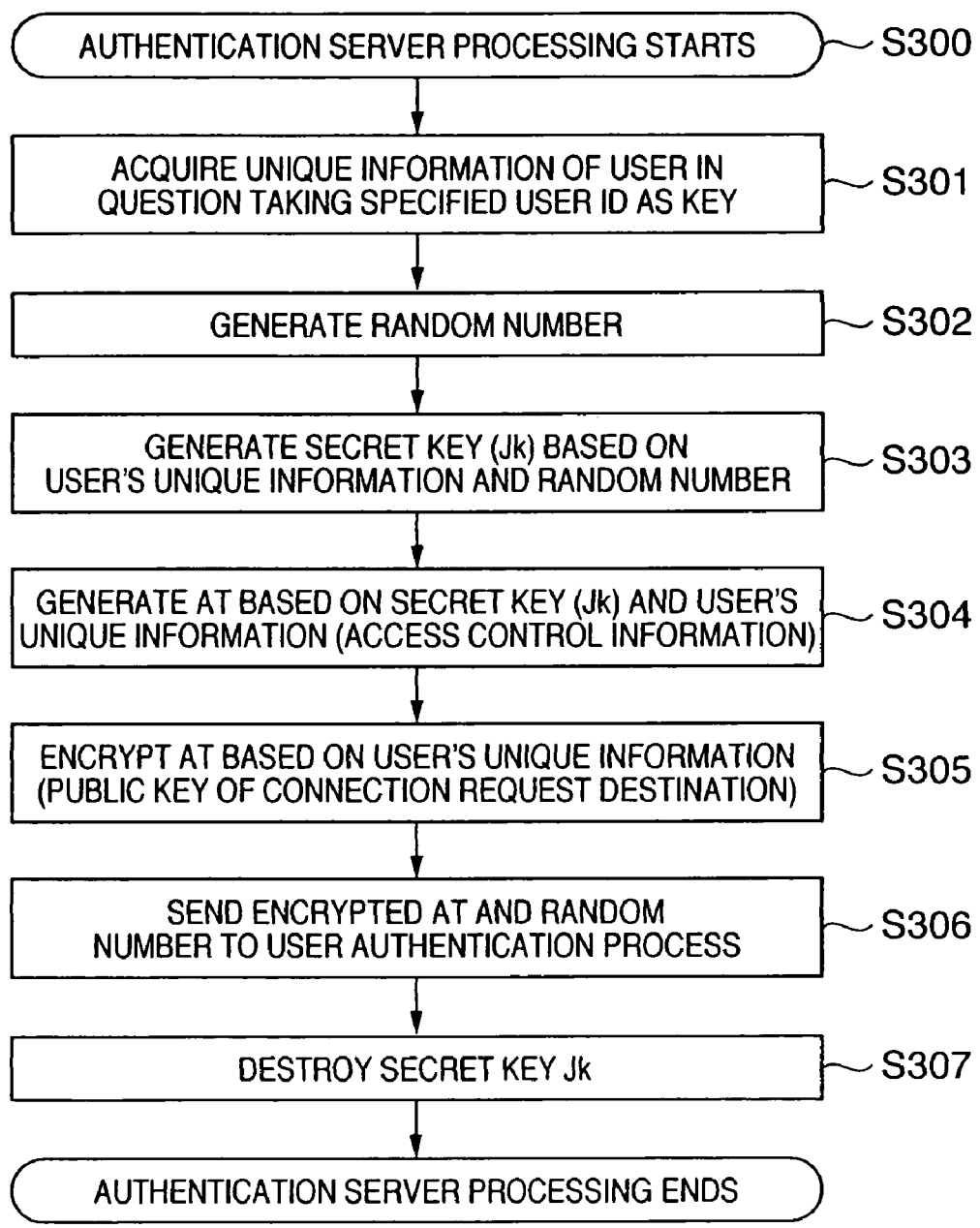
FIG. 3 is a view that illustrates in further detail the processing flow for an access ticket request in an authentication server.

Next, the flow of processing for an access ticket request (step S202 of FIG. 2) at the authentication server 102 will be described in further detail using FIG. 3. Upon receiving a request to issue an access ticket from the client terminal 100, the authentication server 102 commences processing based on the flow shown in FIG. 3 (S300).

Accompanying a request to issue an access ticket from the client terminal 100, the authentication server 102 receives user ID information for identifying the user as well as information specifying the resource to which access is requested. The authentication server 102 employs the user ID specified here as a key to acquire unique information of the user in question (S301). The unique information includes the user's password information (PW) or access control information for access to resources and the like. The authentication server 102 may store such unique information in its own database, or may store the unique information separately in a reliable LDAP server or the like to acquire the information after conducting a secure negotiation process with the authentication server 102. In this embodiment, the authentication server 102 has the database.

Next, the authentication server 102 generates a random number by itself (S302). This random number is used for generating a secret key Jk used in an access ticket or a secret key Jk that is utilized for encrypting confidential information flowing between the client and the server.

The authentication server 102 retrieves password information corresponding to the user ID from the user's unique information, and uses the password and the random number to generate the secret key Jk by itself (S303). An algorithm for secret key generation may be previously specified by the authentication server 102 or may be one that is decided at system implementation. When the authentication server 102 specifies the algorithm, since it is necessary for the client 100 to know what algorithm was used, this information must be notified by the authentication server 102 to the client 100.

The user's unique information also includes access control information relating to the access authority of the user to resources. The authentication server 102 carries out generation of credentials to include access authority information for the user and the information of the generated secret key Jk (S304). Since the format of the credentials may depend on the individual implementation, a detailed description thereof is omitted in this embodiment. In addition to the access authority information for the user and the secret key Jk, the credentials also include a specification of the encryption algorithm to be utilized by the client when encrypting confidential information.

An access ticket request from the client terminal 100 also includes target resource information that shows which resource the client terminal 100 wants to access. Accordingly, the authentication server 102 employs this target resource information (in this embodiment, server identification included therein) as a key to search for and acquire the encryption key Sk of the resources in question. Similarly to the user's unique information, the encryption key Sk is held by the authentication server 102 itself or else an LDAP server can be utilized. The authentication server 102 encrypts the credentials using the acquired encryption key Sk to generate an access ticket (S305). The reason the access ticket is encrypted is that the access ticket is not passed directly to the target resource, but passes through the client terminal 100 and the like en route thereto. In this embodiment, it is assumed that all terminals and devices that the access ticket passes through, including the client terminal 100, can be threatened.

The encrypted access ticket is sent to the client terminal 100 together with the previously generated random number and, where necessary, information regarding the algorithm used to generate the secret key (S306). The authentication server 102 completely destroys the secret key Jk that it generated by itself in the final step to complete the series of processing of the access ticket request (S307). This is because, since the authentication server 102 receives requests to issue access tickets from a plurality of the client terminals 100, the performance of the authentication server 102 will decline if the authentication server 102 manages a secret key for each individual request. Further, the act of managing secret keys is itself an act that could result in increasing vulnerability with respect to security.

<Processing at the Client Terminal>

Figure 4:
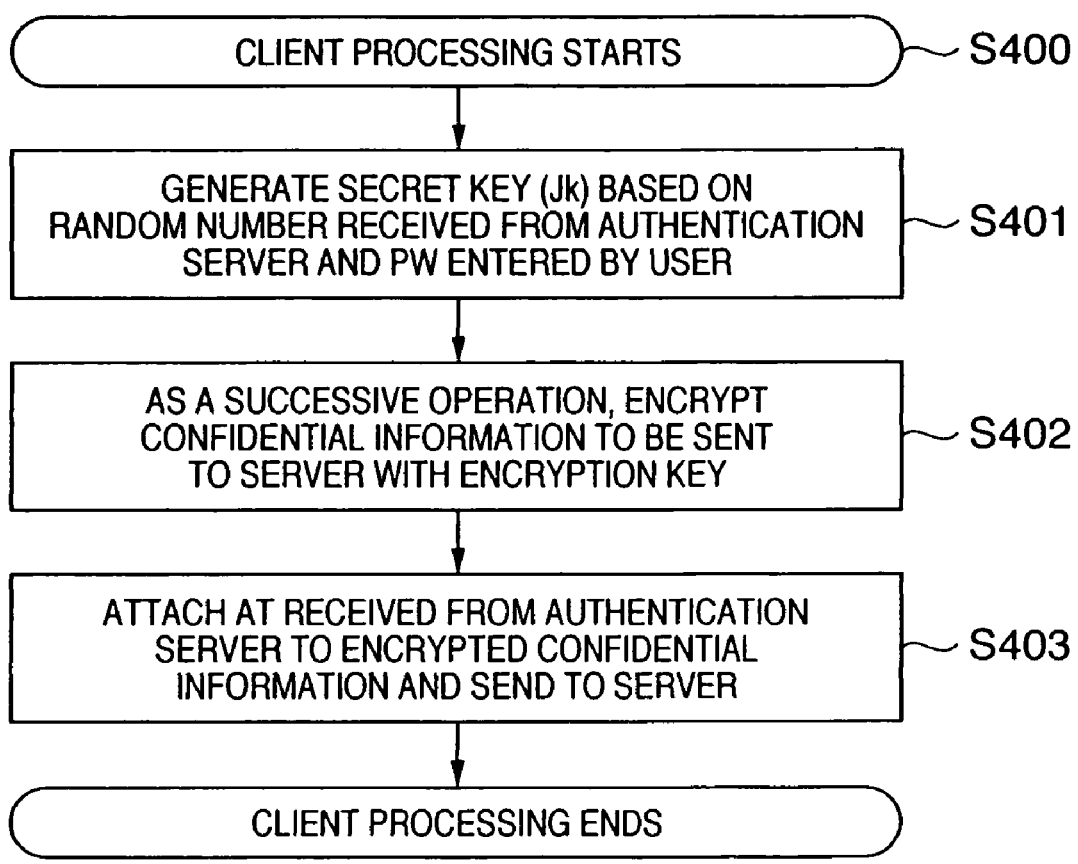
FIG. 4 is a view that illustrates in detail the processing flow in a client terminal following processing of an access ticket request.

FIG. 4 is a view showing in further detail the flow of processing in the client terminal 100 following the access ticket request processing. After a user enters a user ID and a password into the client terminal 100 to specify a resource the user wants to access and send a request to issue an access ticket to the authentication server 102, as a reply thereto, the client terminal 100 receives an access ticket, a random number generated for generating a secret key Jk and, where required, encryption algorithm information from the authentication server 102. The operations in FIG. 4 commence after the client terminal 100 receives these items.

The client terminal 100 retains internally the password entered by the user until this time, and generates a secret key Jk based on the random number received from the authentication server 102 (S401). The algorithm for generating the secret key Jk may also specified by the authentication terminal 102.

When generating the secret key (Jk), the client terminal 100 generates the secret key (Jk) by itself employing as basic information the random number sent from the authentication server 102 and the PW that the user entered directly into the client terminal 100. At this time, although the authentication server 102 has separately generated a secret key (Jk) by itself, this information is not communicated to the client terminal 100. Further, since the access ticket that was passed from the authentication server 102 is encrypted with the encryption key Sk of the server (device) 101, there is no way for the client terminal 100 to know any of the information contained therein. Password information is also not communicated in any form from the authentication server 102, and only the value that the user directly entered into the client terminal 100 is acquired. That is, the client terminal is completely independent from the authentication server 102 in the step of generating the secret key Jk. This fact relates to a step to be described later in which inference of user authentication is carried out on the side of the server (device) 101.

Next, the client terminal 100 encrypts confidential information to be conveyed to the server (device) 101 with the thus-generated secret key Jk (S402). In this embodiment, the confidential information corresponds to print data (PDL data) to be sent to a printer server. The PDL data is generated by a printer driver of the client terminal 100 (not shown in the figure), after which encryption processing is carried out.

The series of processing comprising generation of the secret key Jk, generation of the PDL data and encryption processing for the PDL data is carried out as a unified operation by the printer driver in question. More specifically, the processing of FIG. 4 is one part of processing of the printer driver. Accordingly, it is not possible for a case to occur in which a malicious operational process that exists in the client terminal 100 incorporates malicious data that imparts a fault to the server (device) 101 into the PDL data when conducting encryption processing.

After encrypting the confidential information, the client terminal 100 attaches the access ticket received from the authentication server 102 to the encrypted confidential information, and then sends this to the server (device) 101 (S403). Since both the access ticket and the confidential information are encrypted and the server (device) 101 that received the encrypted data (data including the encrypted confidential information and access ticket) does not know the boundary therebetween, the client terminal 100 inserts a prescribed delimiter at the boundary between the encrypted confidential information and access ticket data, or inserts the data size of the access ticket or the confidential information in a header part of the send data to enable the server (device) 101 to determine the boundary. Which of these two methods is used will depend on the system implementation specifications. Upon sending the data, the processing of the client terminal 100 ends (S404).

<Processing at the Server>

Figure 5:
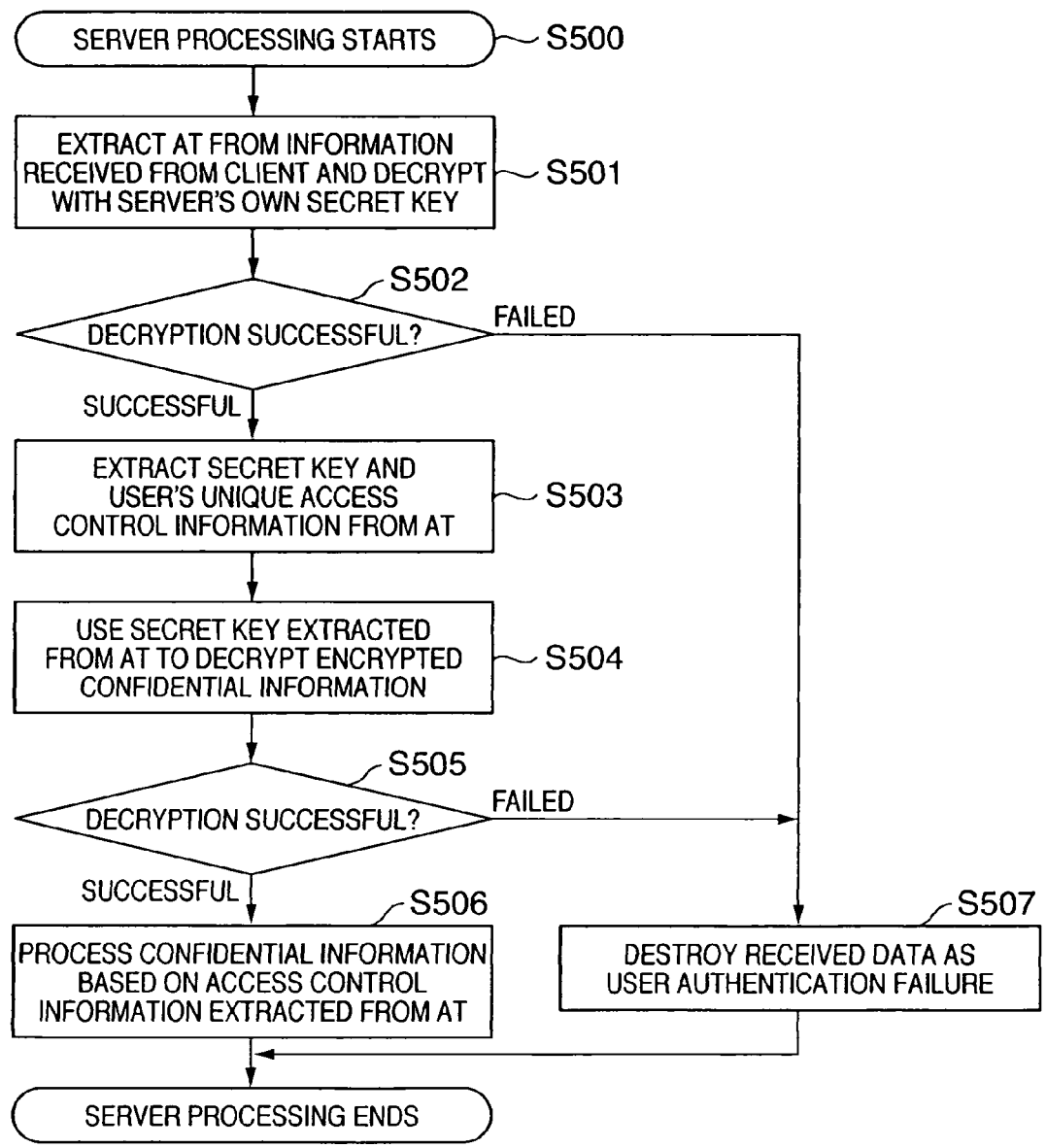
FIG. 5 is view that illustrates in detail the processing flow at the server (device) side after receiving encrypted data.

FIG. 5 is a view illustrating in detail the flow of processing on the server (device) 101 side after receipt of encrypted data. The processing on the server side starts (S500) upon the receipt of encrypted data from the client terminal 100. The server (device) 101 retrieves the delimiter from the received encrypted data and separates the data into an encrypted access ticket portion and an encrypted confidential information portion (S501). Depending on the system configuration, each data size may be stored in a predetermined header part of the encrypted data.

Since the server (device) 101 possesses the decryption key 110a, the server (device) 101 can decrypt the access ticket portion that was encrypted with the encryption key Sk provided by the authentication server 102. The server (device) 101 decrypts the encrypted access ticket using the decryption key 110a (S501). When the decryption is successful, the server (device) 101 executes the process of step S503. However, if the decryption fails, the operation branches to the process of step S507, where it is determined that the user authentication failed and the received data is completely destroyed. In this connection, the decryption processing also includes a function that detects alteration of the encrypted data. This can be implemented using the aforementioned checksum. An electronic signature may also be utilized for this purpose.

When the decryption was successful, the server (device) 101 then executes processing to extract the information stored in the access ticket (S503). The secret key Jk that the authentication server 102 generated by itself and the user's unique access authority information and the like are stored in the access ticket. Further, a time stamp may also be included in the access ticket to prevent a reply attack with the encrypted data.

Next, the server (device) 101 attempts to carry out processing to decrypt the encrypted confidential information using the secret key Jk acquired from the access ticket (S504). The secret key Jk used here is a key that was generated by the authentication server 102. Therefore, if the client terminal 100 was logged into by a true user, the generated key should be the same as the encryption key Jk that was generated by the client terminal 100 when encrypting the confidential information (inference of user authentication), and the decryption processing should thus be successful. Accordingly, at this time the server (device) 101 evaluates the result of decryption of the encrypted confidential information (S505).

If the decryption processing was successful, it indicates that the earlier inference is verified in fact, and the server (device) 101 can assume that the user is one that was duly authenticated by the authentication server 102. In contrast, if the decryption processing fails, there is a possibility that the user that logged into the client terminal 100 is different to the user that the authentication server 102 intended. Hence, the server (device) 101 destroys the received data as data for which authentication failed (S507).

In this connection, it is possible to determine whether or not decryption processing of encrypted data was successful by utilizing a checksum of plaintext block data and the like. The technology for this is already established as a part of an encryption algorithm (for example, a block encryption protocol), and the objective can be achieved by utilizing this. There are also cases in which the success of decryption processing of encrypted data can be evaluated even without recourse to an encryption algorithm. For example, when header information for distinguishing a job type is attached to plaintext job data, whether or not the decryption processing was successful can be evaluated according to whether or not the job type in the header can be distinguished.

When decryption processing of confidential information was successful and the server (device) 101 correctly received the confidential information, the server (device) 101 processes the confidential information in question on the basis of the unique access authority information of the user that was extracted from the access ticket (S506). Since PDL data is received in this embodiment, this data is sent to a PDL controller to carry out print processing.

The processing flow of the server (device) 101 ends with the above series of processing, and the processing result is sent in reply to the client terminal 100 as a response to the data transmission request of the client (S508). The result may be sent in a synchronous or asynchronous form.

As described in the foregoing, according to the encrypted communication system of this embodiment, even in connectionless network information communication as typified by secure printing it is possible to maintain the confidentiality, integrity and usability of data on a communication path thereof.

Further, even if a malicious client terminal exists, since the encryption key used to encrypt data is generated based on the password of the user and a random number generated by the authentication server, the reliability of the encryption key can be ensured.

In addition, since generation of the encryption key and generation of information that is sent to the server are carried out in succession as a unified process, it is difficult for a malicious client to alter data or to generate malicious data. Thus, attacks on the server by a malicious client can be inhibited.

Furthermore, since the server conducts decryption processing using an encryption key that was extracted from an access ticket when decrypting the encrypted data received from the client, when decryption was successful the server can recognize that the encryption key that was utilized for decryption is identical to the encryption key that was used by the client. Thus, the server can infer by analogical reasoning that the user password entered when the user attempted to log in to the client is the password of a true user that was previously registered in the authentication server. Thus, it is also possible for user authentication to be conducted by the server (device) 101 itself without communicating with the authentication server 102.

Modification to the First Embodiment

In this embodiment, the user password and the encryption key of the server (device) 101 are registered in advance in the authentication server 102, and the embodiment was described on the assumption that no vulnerability exists at the time of registering the password and the encryption key in the authentication server 102. However, in reality, there is a large vulnerability inherent in the process of registering a user password or an encryption key of a resource (server) in the authentication server 102. This is because, in reality, there is a threat that an attack will be made on the authentication server 102, and the password and encryption key information will be leaked as a result. The following two countermeasures are available as measures to counteract this threat.

The first countermeasure is a method which physically isolates the authentication server 102 and allows access to only a specified administrator (operational countermeasure). If it is difficult to physically isolate the authentication server 102, a method can also be considered in which only unique information of the resources or users is stored in a directory server (not shown in the figures) and a configuration is adopted in which access to the authentication server 102 can only be made by LDAP, with only the directory server being physically isolated.

The second countermeasure is a method in which, as the encryption key registered in the authentication server 102, a pair of keys comprising a public key and a secret key that are based on a public-key cryptosystem are generated in advance for the server (device) 101, and only the public key of this pair of keys is stored in the authentication server 102. According to this method, since the secret key does not pass at all within the network and since it is the public key that is stored in the authentication server 102, even if a leakage occurred it would be extremely difficult to infer the secret key by analogical reasoning from the leaked information due to the characteristics of the public key encryption algorithm. In a system configured according to the second countermeasure, the access ticket generated at the authentication server is encrypted with the public key of the server (device) 101.

Further, in place of the server's encryption key Sk that is registered in advance in the authentication server 102, a digital certificate that is based on X.509 can be utilized. This digital certificate includes a digital signature and the like in addition to information relating to the public key, and the certificate itself can be authenticated.

Although in this embodiment a case was described in which confidential information is sent from a client to a server, the invention can also be applied to a case of sending data from a server to a client. In addition, the invention can be applied to communication between terminals.

Second Embodiment

Next, as mentioned briefly in the First Embodiment, FIG. 7 shows a configuration in a case in which the encrypted communication system of the First Embodiment is applied to a printing system. In FIG. 7, clients 301-304 and 306, an installation server 305, a printer with a print server attached 311 and an authentication server 102 are connected to a LAN 2000. An installation server is a server that carries out concentrated control of licenses or versions of programs or the like that are installed in the clients. The installation server 305 carries out management regarding the existence or non-existence of updates for programs such as printer drivers, and when a program is updated the installation server 305 sends a message to the clients instructing each of the clients to install the updated program. The authentication server 102 is the same as the authentication server of the First Embodiment. However, a database server 321 in which user authentication information and the like is registered is provided in the back-end thereof.

In this type of configuration, when the respective clients carry out secure printing using the printer with a print server attached 311, the printing system of FIG. 7 functions as the communication system of the First Embodiment. More specifically, the respective clients function as the client 101 of FIG. 1 and the printer with a print server attached 311 functions as the server 101 of FIG. 1. Then, the application data that is the printing object is converted into PDL by a printer driver at the client, after which the operations of FIG. 4 are executed to send the data to be printed to the printer with a print server attached 311. When the printer with a print server attached 311 receives the data from the client and succeeds in decrypting the data (i.e. authentication of the user), the data obtained by decryption is output from a printer engine as printed material.

The communication system of the First Embodiment can also be applied to a case in which a message to install a driver is sent from the installation server 305 to each client. In this case, the installation server 305 corresponds to the client 101 of the First Embodiment and the respective clients correspond to the server of the First Embodiment. Accordingly, the authentication server 102 holds an encryption key Sk for each client. The installation server 305 sends an installation instruction to each client according to the procedures of the First Embodiment. When the client receives the data, it can decrypt the encrypted data and authenticate the originator of the message. The client then interprets the message obtained by decryption and installs the program.

Thus, the encrypted communication system of the First Embodiment can be applied to a printing system that is established with a network and can implement secure printing processing or control of program versions in combination with a function to authenticate an installation instructor.

As described in the foregoing, according to the multiplexing system of an authentication server of this invention, the confidentiality, integrity and usability of data can be maintained on a communication path for even connectionless network information communication, as typified by secure printing, to which it is difficult to apply SSL or TLS. Further, it is possible to distribute the reliability of the authentication server to enable a reduction in costs required for management operations of the authentication system.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application Nos. 2004-165043 filed on Jun. 2, 2004, and 2005-149618 filed on May 23, 2005, which are hereby incorporated by reference herein.

What is claimed is:

1. An encrypted communication system comprising an authentication server having an encryption key and user information containing access control information for each user, a first information processing device that allows entry of a user identification and user information, and a second information processing device having a decryption key corresponding to the encryption key and a printing unit, wherein the authentication server comprises:

a reception unit configured to receive from the first information processing device, after a print instruction is input by a user at the first information processing device to print at the second information processing device, the user identification and information about the second information processing device;

a first generation unit configured to generate first key information based on the user identification received by said reception unit;

a second generation unit configured to identify access control information for the second information processing device based on the user identification received by said reception unit, and to generate a credential based on the first key information generated by said first generation unit and the identified access control information;

an encryption unit configured to encrypt the credential generated by said second generation unit using the encryption key corresponding to the decryption key of the second information processing device; and a first send unit configured to send the credential encrypted by said encryption unit and a predetermined code to the first information processing device, wherein said first send unit does not send the first key information, and the encrypted credential serves as certification information, wherein the first information processing device comprises:

a creation unit configured to create second key information based on predetermined user authentication information and the predetermined code received from the authentication server, and to create encrypted information in which print data to be sent is encrypted using the second key information, and a second send unit configured to send the encrypted information and the certification information received from the authentication server to the second information processing device, wherein the second send unit does not send the second key information created by said creation unit, and wherein the second information processing device comprises:

a first decryption unit configured to decrypt the certification information using the decryption key of the second information processing device;

a second decryption unit configured to decrypt the encrypted information sent from the first information processing device based on the first key information contained in the credential that is obtained by decrypting the certification information by said first decryption unit; and a print unit configured to perform printing based on the print data obtained by decrypting the encrypted information in accordance with access control information contained in the credential.

2. The encrypted communication system according to claim 1, wherein the encryption key is a public key and the decryption key is a secret key.

3. The encrypted communication system according to claim 1, wherein said second decryption unit destroys the encrypted information if the decryption of the encrypted information.

4. An authentication server device that is connected to an information processing device having a decryption key, and to a client device into which a user identification and user information containing access control information are entered and that encrypts data that is a processing object using an encryption key generated from a received code to send the encrypted data together with received certification information to the information processing device, wherein the authentication server device comprises:

a reception unit configured to receive from the client device, after a print instruction is input by a user at the client device to print at the information processing device, the user identification and information about the information processing device;

a first generation unit configured to generate first key information based on the user identification received by said reception unit;

a second generation unit configured to identify access control information for the information processing device based on the user identification received by said reception unit, and to generate a credential based on the first key information generated by said first generation unit and the identified access control information;

an encryption unit configured to encrypt the credential generated by said second generation unit using an encryption key corresponding to the decryption key of the information processing device; and a first send unit configured to send the credential encrypted by said encryption unit and a predetermined code to the client device, wherein said first send unit does not send the first key information, and the encrypted credential serves as certification information.

5. A client device that is connected to an authentication server that stores an encryption key and user information containing access control information for each user, generates first key information, creates certification information in which information including the first key information was encrypted with the encryption key, and sends the certification information and a predetermined code to the client device, and also is connected to an information processing device that has a decryption key corresponding to the encryption key and that decrypts received certification information using the decryption key, wherein the client device comprises:

an entry unit configured to enter a user identification and user authentication information;

a creation unit configured to create second key information based on predetermined user authentication information and the predetermined code received from the authentication server, and to create encrypted information in which print data to be sent is encrypted using the second key information, and a send unit configured to send the encrypted information and the certification information received from the authentication server to the information processing device, wherein the send unit does not send the second key information created by said creation unit.

6. An encrypted communication method for an encrypted communication system comprising an authentication server having an encryption key and user information containing access control information for each user, a first information processing device that allows entry of a user identification and user information, and a second information processing device having a decryption key corresponding to the encryption key, wherein the encrypted communication method comprises the steps of:

sending from the first information processing device to the authentication server, after a user inputs a print instruction to the first information processing device instructing to print at the second information processing device, the user identification and information about the second information processing device;

receiving the user identification and the information about the second information processing device at the authentication server;

generating, in the authentication server, first key information based on the user identification received in the receiving step;

identifying, in the authentication server, access control information for the second information processing device based on the user identification received in the receiving step;

generating, in the authentication server, a credential based on the first key information generated in the generating step and the identified access control information;

encrypting, in the authentication server, the generated credential using the encryption key corresponding to the decryption key of the second information processing device:

sending from the authentication server to the first information processing device the credential encrypted in the encrypting step and a predetermined code, wherein the first key information is not sent in the sending step, and the encrypted credential serves as certification information, creating, in the first information processing device, second key information based on predetermined user authentication information and the predetermined code received from the authentication server;

creating, in the first information processing device, encrypted information in which print data to be sent is encrypted using the second key information; and sending the encrypted information and the certification information that was received from the authentication server from the first information processing device to the second information processing device, wherein the second key information is not sent to the second information processing device, and decrypting the certification information in the second information processing device using the decryption key of the second information processing device;

decrypting, in the second information processing device, the encrypted information sent from the first information processing device based on the first key information contained in the credential obtained by decrypting the certification information; and printing, in the second information processing device, based on the print data obtained by decrypting the encrypted information in accordance with access control information contained in the credential.

7. The system according to claim 1, wherein said authentication server discards the first key information after sending the credential and the predetermined code by said first send unit.

8. The server according to claim 4, wherein the first key information is discarded after sending the credential and the predetermined code by said first send unit.

9. The method according to claim 6, further comprising a step of discarding the first key information after the step of sending the credential and the predetermined code.

* * * * *